(12) United States Patent (10) Patent No.: US 12,386,508 B2
Zhang et al. (45) Date of Patent: Aug. 12, 2025

(54) SYSTEMS AND METHODS FOR CACHE MANAGEMENT OF A STORAGE DEVICE

(71) Applicant: Samsung Electronics Co., Ltd., Suwon-si (KR)

(72) Inventors: Tong Zhang, Mountain View, CA (US); Zongwang Li, Dublin, CA (US); Da Zhang, Fremont, CA (US); Rekha Pitchumani, Oak Hill, VA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 4 days.

(21) Appl. No.: 18/214,286

(22) Filed: Jun. 26, 2023

(65) Prior Publication Data

US 2024/0377945 A1 Nov. 14, 2024

Related U.S. Application Data

(60) Provisional application No. 63/465,158, filed on May 9, 2023.

(51) Int. Cl.
*G06F 3/06* (2006.01)

(52) U.S. Cl.
CPC .......... *G06F 3/0607* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,802,569 A * | 9/1998 | Genduso | G06F 9/383 712/E9.055 |
| 8,146,064 B2 | 3/2012 | Chen et al. | |
| 9,971,693 B2 | 5/2018 | Svendsen | |
| 10,489,295 B2 | 11/2019 | Nellans et al. | |
| 10,540,288 B2 | 1/2020 | Noureddine et al. | |
| 11,366,757 B2 | 6/2022 | Fang et al. | |
| 11,500,797 B2 | 11/2022 | Horwich et al. | |
| 11,507,516 B2 | 11/2022 | Roberts et al. | |
| 2003/0177314 A1* | 9/2003 | Grimsrud | G06F 12/0862 711/112 |
| 2012/0030431 A1* | 2/2012 | Anderson | G06F 12/0862 711/E12.004 |
| 2017/0123796 A1 | 5/2017 | Kumar et al. | |

(Continued)

OTHER PUBLICATIONS

Lin, Jiang, et al., DRAM-Level Prefetching for Fully-Buffered DIMM: Design, Performance and Power Saving, 2007 IEEE International Symposium on Performance Analysis of Systems & Software, San Jose, CA, USA, pp. 94-104, May 21, 2007.

(Continued)

*Primary Examiner* — Charles J Choi

(74) *Attorney, Agent, or Firm* — Lewis Roca Rothgerber Christie LLP

(57) ABSTRACT

Systems and methods for cache management of a storage device are disclosed. The storage device is configured to receive a first code provided by a computing device; execute the first code; perform a first update of the first storage medium based on the first code; receive a second code provided by the computing device; execute the second code; and perform a second update of the first storage medium based on the second code.

20 Claims, 6 Drawing Sheets

(56) References Cited

U.S. PATENT DOCUMENTS

| | | |
|---|---|---|
| 2021/0011706 A1 | 1/2021 | Nachimuthu et al. |
| 2022/0188117 A1 | 6/2022 | Kalamatianos et al. |
| 2023/0004318 A1 | 1/2023 | Zhang et al. |
| 2023/0012822 A1 | 1/2023 | Shah et al. |

OTHER PUBLICATIONS

European Search Report for EP Application No. 24172189.3 dated Aug. 5, 2024, 11 pages.

\* cited by examiner

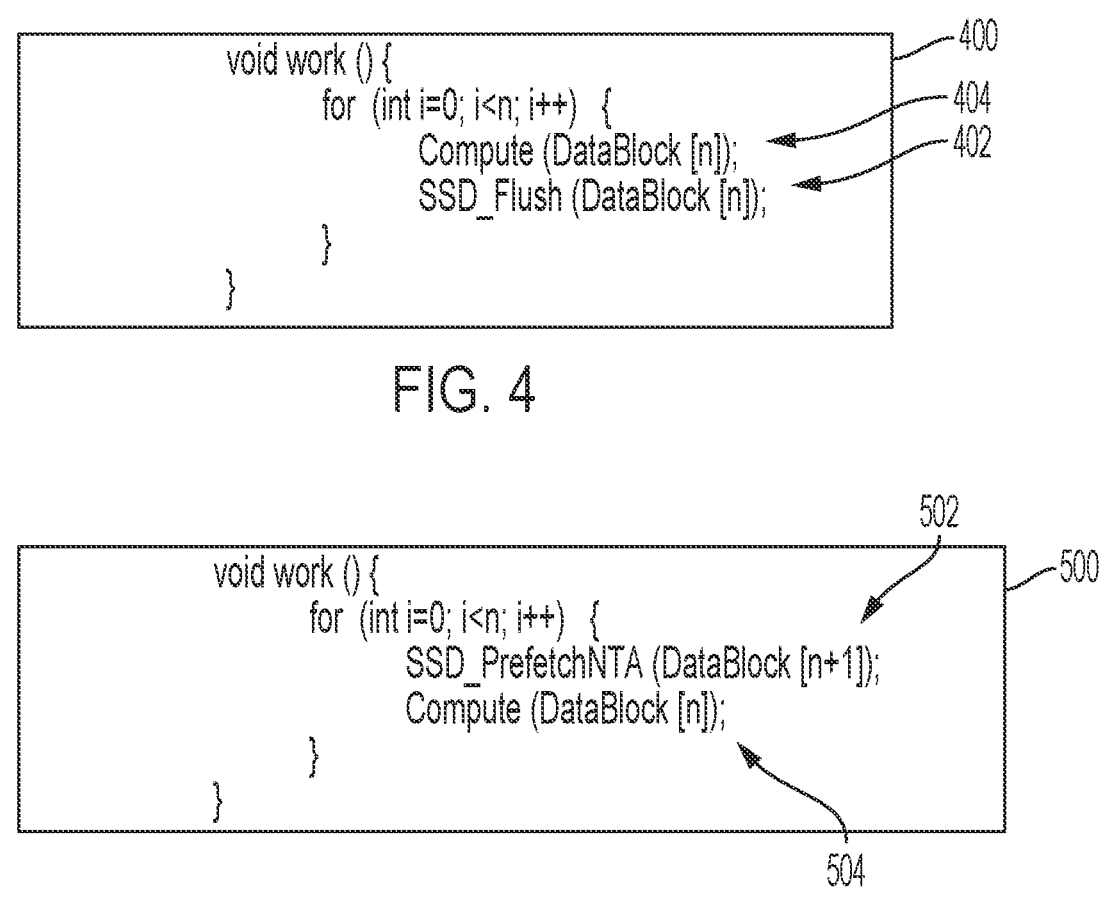

```
void work () {
    for (int i=0; i<n; i++) {
        Compute (DataBlock [n]);
        SSD_Flush (DataBlock [n]);
    }
}
```

FIG. 4

```
void work () {
    for (int i=0; i<n; i++) {
        SSD_PrefetchNTA (DataBlock [n+1]);
        Compute (DataBlock [n]);
    }
}
```

FIG. 5

SYSTEMS AND METHODS FOR CACHE MANAGEMENT OF A STORAGE DEVICE

CROSS-REFERENCE TO RELATED APPLICATION(S)

The present application claims priority to and the benefit of U.S. Provisional Application No. 63/465,158, filed May 9, 2023, entitled "SOFTWARE DEFINED PREFETCHER AND CACHE MANAGEMENT FOR DUAL MODE PERSISTENT MEMORY—THROUGH CS API" the entire content of which is incorporated herein by reference.

FIELD

One or more aspects of embodiments according to the present disclosure relate to storage devices, and more particularly to managing a cache in a storage device.

BACKGROUND

Applications may perform computations on large amounts of data. As such types of computations increase, the demand for storage devices and memory may also increase.

The above information disclosed in this Background section is only for enhancement of understanding of the background of the present disclosure, and therefore, it may contain information that does not form prior art.

SUMMARY

One or more embodiments of the present disclosure are directed to a storage device. The storage device includes a first storage medium, a processor configured to communicate with the first storage medium, and a memory coupled to the processor. The memory stores instructions that, when executed by the processor, cause the processor to: receive a first code provided by a computing device; execute the first code; perform a first update of the first storage medium based on the first code; receive a second code provided by the computing device; execute the second code; and perform a second update of the first storage medium based on the second code.

According to some embodiments, the first code is for retrieving first data from a second storage medium and storing the first data into the first storage medium.

According to some embodiments, the second code is for modifying the first data from the first storage medium.

According to some embodiments, the second code is for retrieving second data from the second storage medium and storing the second data into the first storage medium.

According to some embodiments, the first storage medium includes volatile memory, and the second storage medium includes non-volatile memory.

According to some embodiments, the instructions further cause the processor to: receive a first command from the computing device; access the first storage medium for the first data based on the first command; determine a first status of the first data associated with the first storage medium; and retrieve the first data from the first storage medium.

According to some embodiments, the instructions further cause the processor to: receive a second command from the computing device; check the first storage medium for the first data based on the second command; determine a second status of the first data associated with the first storage medium; and retrieve the first data from the second storage medium.

According to some embodiments, the storage device includes a cache controller for processing movement of data from the second storage medium into the first storage medium.

According to some embodiments, the first code includes compiled machine-readable code.

According to some embodiments, the computing device is configured to provide an interface for generating source code, wherein the source code is compiled into the first code.

One or more embodiments of the present disclosure are also directed to a method that includes: receiving a first code provided by a computing device; executing the first code; performing a first update of a first storage medium based on the first code; receiving a second code provided by the computing device; executing the second code; and performing a second update of the first storage medium based on the second code.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 4 depicts example source code for a second work process including a second cache management function according to one or more embodiments;

FIG. 5 depicts example source code for a third work process including a third cache management function according to one or more embodiments;

DETAILED DESCRIPTION

Figure 1:
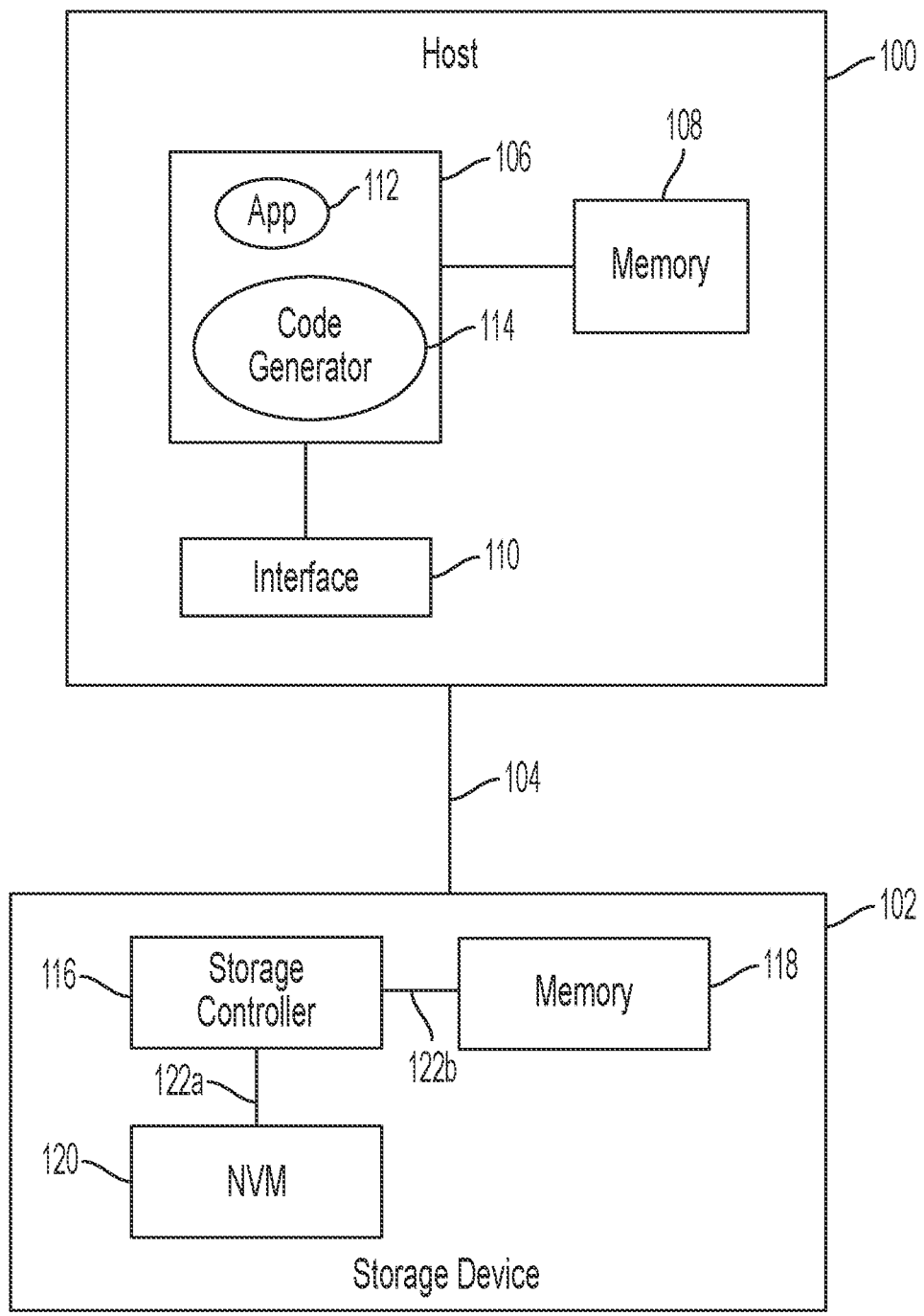
FIG. 1 depicts a block diagram of a system for managing a cache memory of a storage device according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

An application may interact with a storage or memory device (collectively referenced as storage device) for reading (or loading) and writing (or storing) data. Latencies are generally involved in accessing the storage device. The type of latency involved may depend on the storage medium included in the storage device. Certain storage media have lower latencies than other storage media. Thus, it may be desirable to manage data in the storage device so as to improve overall system performance and responsiveness.

In general terms an application running on a host computing device (referred to as a "host") may need to store and load data to and from a storage device. Latencies are generally involved in accessing the storage device. The latencies involved may differ depending on the storage medium storing the data that is to be retrieved. For example, the storage device may have both a volatile storage medium (e.g., dynamic random access memory (DRAM)) and a non-volatile storage medium (e.g., NAND flash memory). The latencies of the volatile storage medium may be lower than the latencies of the non-volatile storage medium. It may be desirable to use the volatile storage medium as cache memory where a block, chunk, or page of data (collectively referred to as a "block") that is anticipated to be accessed soon, may be moved to the cache memory.

In general terms, embodiments of the present disclosure are directed to systems and methods for providing management of a cache memory in a storage device. The management may include, for example, specifying, via software, a prefetching algorithm to be used for prefetching data from a non-volatile memory (NVM) of the storage device, to the cache memory. In some embodiments, a user may program the cache management instructions via an interface provided by the host. The user may determine the type of instructions to program based on, for example, characteristics of an application that is to access the storage device, characteristics of the storage device, and/or the like.

In some embodiments, the cache management instructions include prefetching instructions that, when executed by the storage device, cause the prefetching of data from the NVM to the cache memory—all within the same storage device. In some embodiments, unlike a prefetching function executed by a central processing unit (CPU) of the host that prefetches data from a storage medium into a CPU cache, the prefetch instructions according to one or more embodiments are loaded and executed by the storage device. This helps free up the host CPU and other host resources to execute instructions other than prefetching instructions.

In some embodiments, the prefetching of data from the NVM to the cache memory also helps reduce memory access latency (e.g., in the event of a cache hit), which helps improve overall system performance and responsiveness. For example, by prefetching data that results in a cache hit, the waiting time of the CPU to receive the requested data from the storage device, may be reduced.

FIG. 1 depicts a block diagram of a system for managing a cache memory of a storage device according to one or more embodiments. The system may include a host computing device ("host") 100 coupled to a storage device 102 over one or more data communication links 104. In some embodiments, the data communication links 104 may include various general-purpose interfaces such as, for example, Ethernet, Universal Serial Bus (USB), and/or any wired or wireless data communication link.

The host 100 may include a processor 106, memory 108, and host interface 110. The processor 106 may be configured to run one or more applications 112 based on instructions stored in the memory 108. The application 112 may be any application configured to transmit requests (e.g., data access requests) to the storage device 102. For example, the application 112 may be a big data analysis application, e-commerce application, database application, machine learning application, and/or the like. Data requests such as, for example, load and store requests, may be generated during the running of the application 112. Results of the data requests may be used by the application to generate an output.

The application 112 may communicate with the storage device 102 via the host interface 110. The host interface 110 may include physical connections as well as software instructions which may be executed by the processor 106. In some embodiments, the host interface 110 allows the host 100 and the storage device 102 to send and receive data using a protocol such as, for example, CXL, although embodiments are not limited thereto. Performance of the application 116 may depend on how fast requested data is retrieved by the storage device 102 and returned to the application.

In addition or in lieu of CXL, the host interface 110 may use other protocols such as Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

In some embodiments, the processor 106 is further configured to execute a code generator module 114. The code generator module 114 may provide an interface that may be accessed by a user to generate cache management instructions to manage the cache memory of the storage device 102.

The cache management instructions may include cache prefetch instructions, cache flush instructions, cache replacement instructions, cache locality hints, and/or the like.

In some embodiments, the code generator module 114 provides a library of cache management functions that the user may select depending on the desired type of cache management. The desired type of cache management may depend, for example, on the type of application 112 accessing the storage device. For example, random workload access patterns may be hard to predict from the storage device itself. However, a user application may be able to predict data that may be accessed next. The predicted data may be used to generate a prefetch hint by the code generator module 114 for sending to the storage device.

The storage device 102 may take the form of a solid state drive (SSD), persistent memory, and/or the like. In some embodiments, the storage device 102 includes (or is embodied as) an SSD with cache coherency and/or computational capabilities. In some embodiments, the storage device 102 includes (or is embodied as) a dual mode persistent memory with dual mode access to its storage space. In a first mode, the storage device 102 is accessible as disk storage (e.g., via CXL.io). In a second mode, the storage device 102 is accessible as a device-attached memory (e.g., via CXL.mem or CXL.cache).

In some embodiments, the storage device 102 includes a storage controller 116, storage memory 118, and non-volatile memory (NVM) 120. The storage memory 118 may be high-performing memory of the storage device 102, and may include (or may be) volatile memory, for example, such as DRAM, but the present disclosure is not limited thereto, and the storage memory 118 may be any suitable kind of high-performing volatile or non-volatile memory. Although a single storage memory 118 is depicted for simplicity sake, a person of skill in the art should recognize that the storage device 102 may include other local memory for temporarily storing other data for the storage device.

In some embodiments, the storage memory 118 is used and managed as cache memory. In this regard, the storage memory (also referred to as a cache) 118 may store copies of data stored in the NVM 120. For example, data that is to be accessed by the application 112 in the near future may be copied from the NVM 120 to the storage memory 118 for allowing the data to be retrieved from the storage memory 118 instead of the NVM 120. In some embodiments, the storage memory 118 has a lower access latency than the NVM 120. Thus, in some embodiments, accessing data from the storage memory 118 helps improve overall system performance and responsiveness.

The NVM 120 may persistently store data received, for example, from the host 100. The NVM 120 may include, for example, NAND flash memory, but the present disclosure is not limited thereto, and the NVM 120 may include any suitable kind of memory for persistently storing the data according to an implementation of the storage device 102 (e.g., magnetic disks, tape, optical disks, and/or the like).

The storage controller 116 may be connected to the NVM 120 and the storage memory 118 over one or more storage interfaces 122a, 122b (collectively referenced as 122). The storage controller 116 may receive input/output (I/O) requests (e.g. load or store requests) from the host 100, and transmit commands to and from the NVM 120 and/or storage memory 118 for fulfilling the I/O requests. In this regard, the storage controller 116 may include at least one processing component embedded thereon for interfacing with the host 100, the storage memory 118, and the NVM 120. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 118 or NVM 120 according to the data access instructions.

In some embodiments, the storage controller 116 receives cache management program instructions from the host 100. The storage controller 116 may load and execute the program instructions to control management of the storage memory 118. The program instructions may be in an extended Berkeley Packet filter (eBPF) program format, although embodiments are not limited thereto. The program instructions may be implemented in other formats such as, for example, other types of machine code, bytecode, or program format that may be executed by the storage controller 116. The loading and executing of the program instructions by the storage controller 116 avoids invoking the host processor 106 to execute the instructions.

In some embodiments, the cache management instructions include data prefetch instructions that allow the storage controller 116 to prefetch data from the NVM 120 to the storage memory 118. Prefetching data may entail, for example, retrieving data from the NVM 120 to the storage memory 118 prior to the application 112 needing the data to perform a computation. The details of the prefetching algorithm including, for example, the blocks of data that are to be prefetched, the size of the blocks, and/or the like, may be determined by a user via the code generator 114. In this manner, the user may control the prefetching policy via software, while the execution of the software may be by the storage controller 116.

Figure 2:
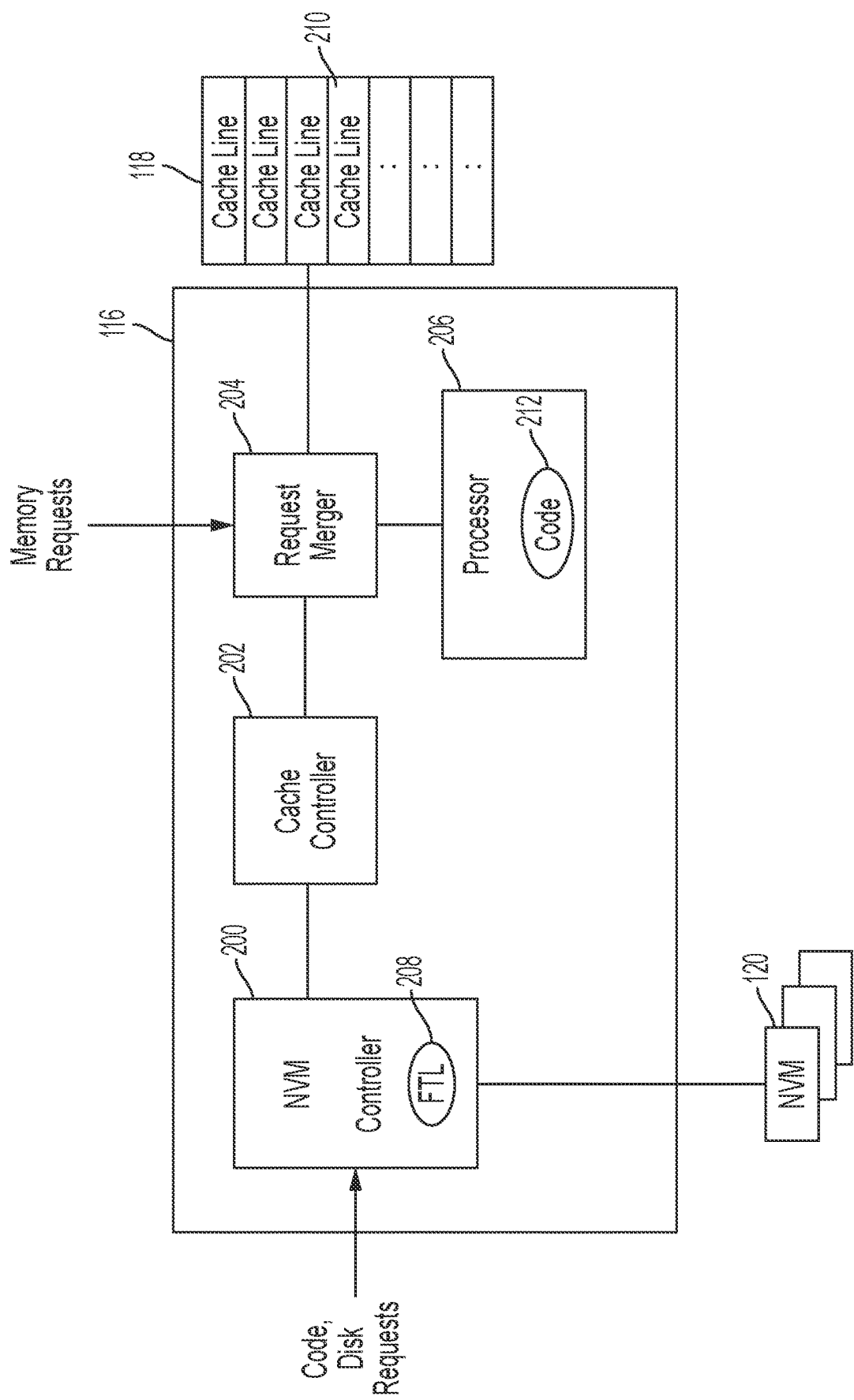
FIG. 2 depicts a block diagram of a storage controller according to one or more embodiments.

FIG. 2 depicts a block diagram of the storage controller 116 according to one or more embodiments. The storage controller 116 includes an NVM controller 200, cache controller 202, request merger 204, and storage processor 206. Although the NVM controller 200, cache controller 202, request merger 204, and storage processor 206 are assumed to be separate components, a person of skill in the art will recognize that one or more of the components may be combined or integrated into a single component, or further subdivided into further sub-components without departing from the spirit and scope of the inventive concept.

In some embodiments, the NVM controller 200, cache controller 202, and/or storage processor 206 may include, for example, a digital circuit (e.g., a microcontroller, a microprocessor, a digital signal processor, or a logic device (e.g., a field programmable gate array (FPGA), an application-specific integrated circuit (ASIC), and/or the like (collectively referenced as a processor)). The digital circuit may include a memory storing instructions (e.g., software, firmware, and/or hardware code) for being executed by the processor.

In some embodiments, the NVM controller 200 is configured to receive data access requests from the host 100. Using CXL as an example, the data access request may be based on a CXL.io protocol that allows the NVM 120 to be accessed by the host CPU as disk storage. In some embodiments, the NVM controller 200 includes a flash translation layer (FTL) 208 that receives the data access request and interfaces with the NVM 120 to read data from, and write data to, the NVM. In this regard, the FTL 208 may translate a disk block address included in the data access request, to a flash block address. In doing so, the FTL 208 may engage in wear leveling to move data around the storage cells of the NVM 120 to evenly distribute the writes to the NVM 120.

Referring again to CXL as an example, the data access request may be based on a CXL.mem or CXL.cache protocol that allows the NVM 120 to be accessed by the host CPU as a device-attached memory. In some embodiments, the request merger 204 receives the memory access requests, and invokes the cache controller 202 for determining whether the requested data is stored in the storage memory 118 (e.g., a cache hit). The storage memory 118 may store data in one or more cache lines 210. The cache controller 202 may identify an appropriate cache line 210 where the requested data may be stored (e.g., based on the requested memory address), and retrieve the requested data from the identified cache line is present in the cache line. The requested data may be returned to the requesting application 112.

In the event that the requested data is not located in the storage memory 118 (e.g., cache miss), the cache controller 202 may be communicate with the NVM controller 200 for accessing and returning the data from the NVM 120. In this regard, the cache controller 202 or the FTL 208 may be configured to translate a requested memory block address into a flash block address. The latency involved in accessing the data from the NVM 120 may be higher than the latency involved in accessing the data from the storage memory 118. It may be desirable, therefore, to manage the storage memory 118 according to one or more cache management policies, to allow efficient use of the storage memory 118 for improving a cache hit rate.

In some embodiments, cache management functions including, for example, cache prefetch instructions generated via the code generator 114, are loaded into the storage processor 206 (e.g., into a local memory accessible to the storage processor 206) as executable code 212. In this regard, the NVM controller 200 may receive the code 212 from the host 100, and store the code in the storage processor 206.

The storage processor 206 may execute the code 212 loaded by the NVM controller 200 to perform one or more cache management functions. For example, if the code is for prefetching data from the NVM 120 into the storage memory 118, the storage processor 206 may interact with the cache controller 202 (e.g., via the request merger 204) for effectuating the movement of data from the NVM 120 into a cache line 210 of the storage memory 118.

In some embodiments, the storage processor 206 is sandboxed from the other components (e.g., the FTL 208, cache controller 202, etc.) of the storage controller 116 to hide details of the movement of the data in and out of the storage memory 118. For example, in the event that the code 212 includes data prefetching instructions, the storage processor 206 executes the code and transmits a request for a memory block to be prefetched. The request may cause additional processing and/or data movement details that may be hidden from the storage processor 206. Such processing and/or data movement details may include translating the memory block into a flash address, selecting a cache address (e.g., cache line 210) to store the data, and the reading and storing of the data to the cache address.

Figure 3:
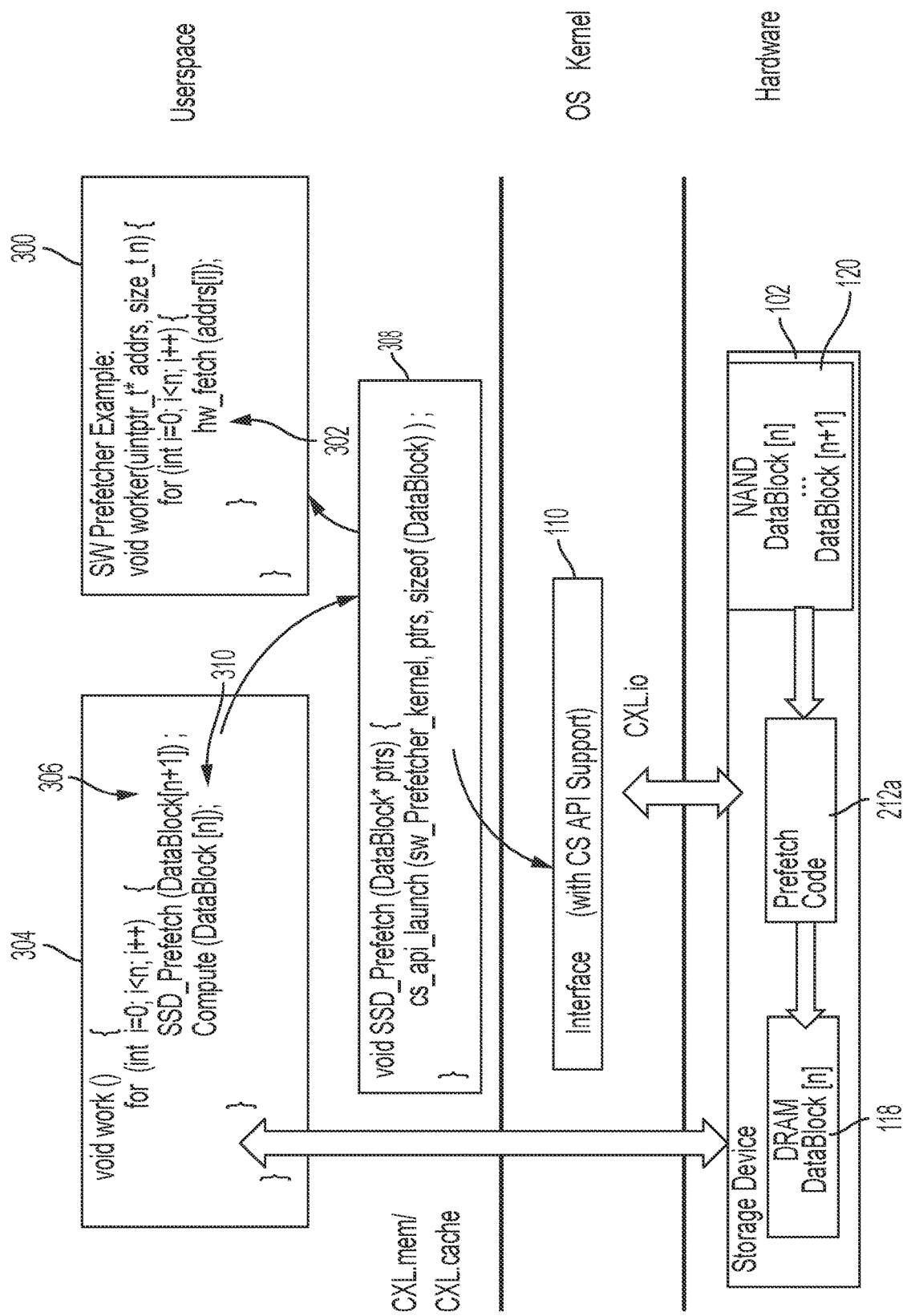
FIG. 3 depicts example code that may be invoked for executing a cache prefetch algorithm according to one or more embodiments.

FIG. 3 depicts example code that may be invoked for executing a cache prefetch algorithm according to one or more embodiments. In some embodiments, a user accesses the code generator module 114 to generate source code 300 for a software prefetcher. The software prefetcher source code 300 may include, for example, a prefetch function 302 that prefetches data stored in one or more memory addresses. The prefetch function 302 may be, for example, one or more library functions provided by the host 100.

In some embodiments, the prefetcher source code 300 is compiled by a compiler to generate machine code, bytecode, or another executable program format. In some embodiments, the prefetcher source code 300 is compiled into the eBPF program format.

In some embodiments, a work process 304 may be executed by an application for retrieving data from the storage device 102 and performing computations using the retrieved data. The computations may be performed via a compute function 310. The compute function 310 that uses data block (n) may cause the transmitting of a data access request to the data storage device 102 for data block (n). The application may need to wait for data block (n) to be returned in order to perform the compute function. Thus, performance of the application may depend on the latency of the storage device 102 in returning the requested data block. The latency may be lower if the requested data block is returned from the storage memory 118. The latency may be higher if the requested data block is returned from the NVM 120.

In order to reduce the memory access latency of the storage device 102, the work process 304 may include a storage prefetch function 306 that causes the storage device 102 to prefetch a block of data (n+1) from the NVM 120 to the storage memory 118, prior to request of the data for executing the compute function 310. In this manner, when a load command for data block (n) is received by the storage device 102 when the compute function 310 is called, the requested data block may already be prefetched and reside in the storage device 118, allowing the data to be retrieved and returned from the storage device 118 instead of the NVM 120.

In some embodiments, execution of the storage prefetch function 306 invokes an application program interface (API) function 308 that launches a prefetcher kernel (e.g., the compiled version of the prefetcher source code 300) onto the storage device 102. In some embodiments, the API function 308 invokes the host interface 110 for establishing a communication path with the storage device 110 via, for example, CXL.io. The prefetcher kernel may be loaded to the storage processor 206 via the established communication path, as executable code 212a.

Once loaded, the storage processor 206 executes the executable code 212a to prefetch the requested memory block (e.g., block n+1). In this regard, the storage processor 206 may transmit a command to the cache controller 202 (e.g., via the request merger 204), to prefetch the requested memory block to the storage memory 118. The cache controller 202 may be configured with instructions to carry out the data movement from the NVM 120 to the storage memory 118. That is, the user need not expressly code the data movement instructions. The instructions that carry out the data movement may remain hidden to the user.

In some embodiments, other cache management functions in lieu or in addition to the storage prefetch function 306 are generated by a user to manage other aspects of the cache. For example, cache management instructions such as cache flush instructions, cache replacement instructions, cache locality hints, and/or the like, may be generated by the user via the code generator module 114, and loaded to the storage processor 206 for execution thereon.

FIG. 4 depicts example source code for a second work process 400 including a second cache management function 402 according to one or more embodiments. The second cache management function 402 may be, for example, a storage flush function for causing the storage device 102 to flush a data block used in a prior compute function 404. The flushing may be desirable, for example, to modify (e.g., remove) from the storage memory 118, data blocks that are used in a streaming fashion and are not anticipated to be used again. In such case, it may be unnecessary to keep the data in the storage memory 118.

Compiled code for the flush function may be launched onto the storage device 102 via an API function (similar to the API function 308). The storage processor 206 may execute the compiled code for achieving the cache flush from the storage device 102. In some embodiments, the storage processor 206 may execute one or more compiled codes for achieving one or more cache management operations.

FIG. 5 depicts example source code for a third work process 500 including a third cache management function 502 according to one or more embodiments. The third cache management function 502 may be, for example, a cache locality hint function indicative of locality (or lack of locality) of data that is to be used in a compute function 504. For example, a non-temporal (NTA) hint for a data block may indicate that the block lacks locality, causing the storage processor 206 to discard the block after use in the compute function 504.

Compiled code for the cache locality hint function may be launched onto the storage device 102 via an API function (similar to the API function 308). The storage processor 206 may execute the compiled code for discarding (in the event of an NTA hint) the block after use in the compute function 504.

Figure 6:
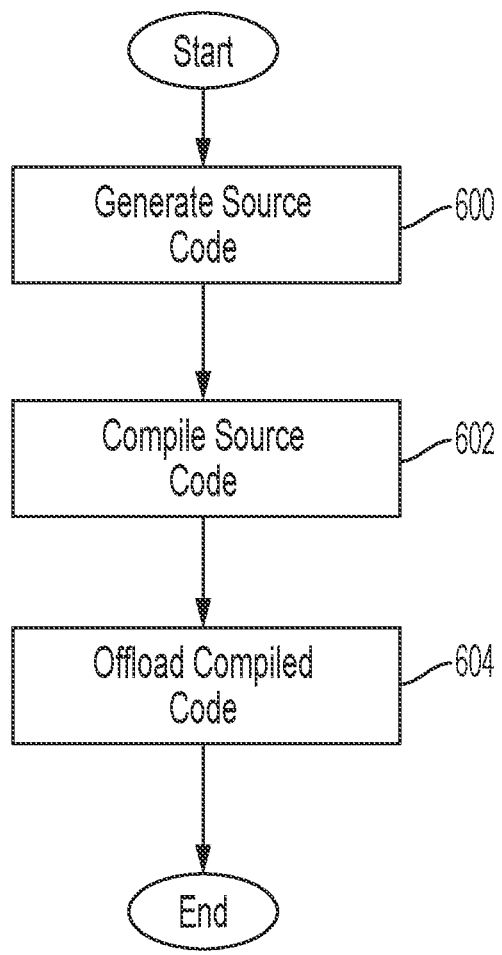
FIG. 6 depicts a flow diagram of a process for generating source code for a cache management function according to one or more embodiments.

FIG. 6 depicts a flow diagram of a process for generating source code for a cache management function according to one or more embodiments. The process starts, and in act 600, a user accesses the code generator 114 (which may include a user interface) for generating source code for a desired cache management function 600. The generated source code may be referenced in a work process executed by an application 112. In some embodiments, the cache management function that is programmed by the user may depend on attributes of the application 112 and/or storage device 102. In this regard, the user may customize the cache management function on a per application manner.

In act 602, the source code is compiled by a compiler. The output of the compiler may be, for example, machine readable code.

In act 604, the compiled machine readable code is off-loaded or provided to the storage device 102 for execution thereon. In this regard, the storage device 102 may load the code onto the storage processor 206 via a command to the NVM controller 200. The command may adhere, for example, to a CXL.io protocol. The loaded code may then be executed by the storage processor 206.

Figure 7:
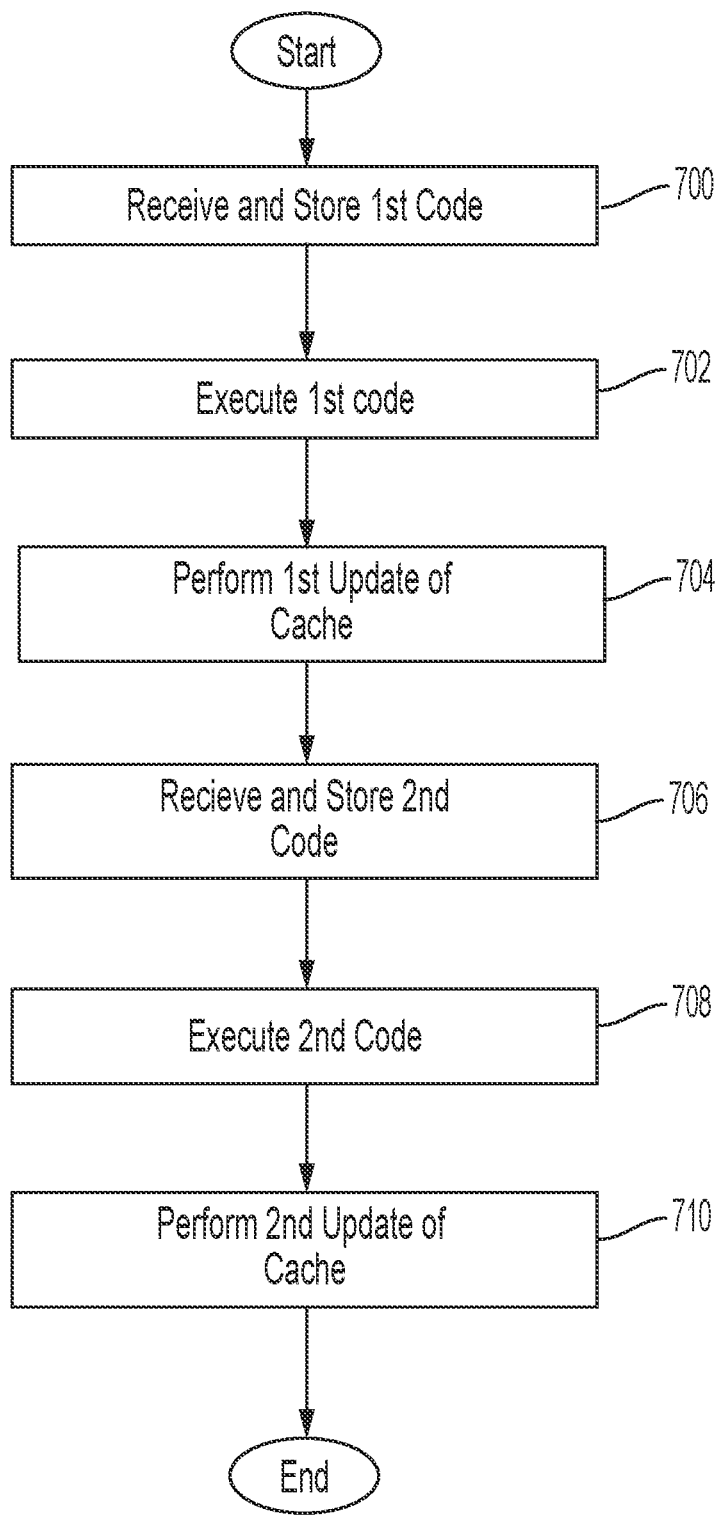
FIG. 7 depicts a flow diagram of a process for executing a cache management code according to one or more embodiments.

FIG. 7 depicts a flow diagram of a process for executing a cache management code according to one or more embodiments. The process starts, and in act 700, the storage device 102 receives and stores a first cache management code in the storage processor 206 (e.g., in a local memory accessible to the storage processor). The first code may be, for example, a prefetch code, cache flush code, cache replacement code, cache locality hint, and/or the like.

In act 702, the storage processor 206 executes the first code. Execution of the first code by the storage processor 206 may avoid consuming host CPU resources to execute the code. In some embodiments, execution of the first code causes an update (e.g., a first update) of the storage memory 118 (e.g., cache). Depending on the type of code that is executed, the update may add one or more blocks of data into the storage memory 118, modify one or more blocks of data from the storage memory, remove one or more blocks of data from the storage memory, and/or the like.

In act 704, the storage processor 206 performs the update based on the first code. For example, if the update is to add data into the storage memory 118, the storage processor 206 may transmit a corresponding request to the request merger 204. The request manager may transmit one or more other corresponding commands to other components of the storage device 102 to effectuate the data movement from the NVM 120 to the storage memory 118. In response to the one or more other corresponding commands, the cache controller 202 may identify a cache address in which to store the data, the FTL 208 may translate a requested memory block address into a flash block address, and the NVM 120 may retrieve the data from the flash block address.

In act 706, the storage device 102 receives and stores a second cache management code in the storage processor 206 (e.g., in a local memory accessible to the storage processor). For example, if the first code is a prefetch code, the second code may be a different prefetch code or code for performing a different type of cache management function (e.g., cache flush).

In act 708, the storage processor 206 executes the second code. Execution of the second code by the storage processor 206 may avoid consuming host CPU resources to execute the code. In some embodiments, execution of the second code causes an update (e.g., a second update) of the storage memory 118 (e.g., cache). For example, the second update may add one or more blocks of data into the storage memory 118, modify one or more blocks of data from the storage memory, remove one or more blocks of data from the storage memory, and/or the like.

In act 710, the storage processor 206 performs the update based on the second code.

It should be appreciated that the systems and methods for cache management of a storage device that have been described herein provide various advantages, including: 1) they allow a user to manage the cache in the storage device (e.g., a dual mode persistent memory); 2) they allow a user to implement a software based cache prefetch algorithm and other customized cache management policies that may be executed by the storage device (e.g., by the dual mode persistent memory); 3) they allow the details of the data movement function (e.g., in and out of the cache) to remain hidden, and instead a data movement API (e.g., a library of instructions) is exposed for access by the user in generating the cache management instructions; 4) they help reduce memory access latency (e.g., in the event of a cache hit), and may further help reduce first time cold miss penalties; and 5) they improve overall system performance and responsiveness due to the reduced memory access latency.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for cache management of a storage device have been specifically described and illustrated herein, many modifications and variations will be apparent to those skilled in the art. Accordingly, it is to be understood that systems and methods for cache management of storage device constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A storage device comprising: a first storage medium; a processor configured to communicate with the first storage medium; and a memory coupled to the processor, the memory storing instructions that, when executed by the processor, cause the processor to: receive a first code provided by a computing device; execute the first code; perform a first update of the first storage medium based on the first code; receive a second code provided by the computing device; execute the second code; and perform a second update of the first storage medium based on the second code.

Statement 2. The storage device of Statement 1, wherein the first code is for retrieving first data from a second storage medium and storing the first data into the first storage medium.

Statement 3. The storage device of Statement 2, wherein the second code is for modifying the first data from the first storage medium.

Statement 4. The storage device of Statement 2, wherein the second code is for retrieving second data from the second storage medium and storing the second data into the first storage medium.

Statement 5. The storage device of Statement 2, wherein the first storage medium includes volatile memory, and the second storage medium includes non-volatile memory.

Statement 6. The storage device of Statement 2, wherein the instructions further cause the processor to: receive a first command from the computing device; access the first storage medium for the first data based on the first command; determine a first status of the first data associated with the first storage medium; and retrieve the first data from the first storage medium.

Statement 7. The storage device of Statement 6, wherein the instructions further cause the processor to: receive a second command from the computing device; check the first storage medium for the first data based on the second command; determine a second status of the first data associated with the first storage medium; and retrieve the first data from the second storage medium.

Statement 8. The storage device of Statement 2, wherein the storage device includes a cache controller for processing movement of data from the second storage medium into the first storage medium.

Statement 9. The storage device of Statement 1, wherein the first code includes compiled machine-readable code.

Statement 10. The storage device of Statement 1, wherein the computing device is configured to provide an interface for generating source code, wherein the source code is compiled into the first code.

Statement 11. A method comprising: receiving a first code provided by a computing device; executing the first code; performing a first update of a first storage medium based on the first code; receiving a second code provided by the computing device; executing the second code; and performing a second update of the first storage medium based on the second code.

Statement 12. The method of Statement 11, wherein the first code is for retrieving first data from a second storage medium and storing the first data into the first storage medium.

Statement 13. The method of Statement 12, wherein the second code is for modifying the first data from the first storage medium.

Statement 14. The method of Statement 12, wherein the second code is for retrieving second data from the second storage medium and storing the second data into the first storage medium.

Statement 15. The method of Statement 12, wherein the first storage medium includes volatile memory, and the second storage medium includes non-volatile memory.

Statement 16. The method of Statement 12 further comprising: receiving a first command from the computing device; accessing the first storage medium for the first data based on the first command; determining a first status of the first data associated with the first storage medium; and retrieving the first data from the first storage medium.

Statement 17. The method of Statement 16 further comprising: receiving a second command from the computing device; checking the first storage medium for the first data based on the second command; determining a second status of the first data associated with the first storage medium; and retrieving the first data from the second storage medium.

Statement 18. The method of Statement 12, wherein the storage device includes a cache controller for processing movement of data from the second storage medium into the first storage medium.

Statement 19. The method of Statement 11, wherein the first code includes compiled machine-readable code.

Statement 20. The method of Statement 11, wherein the computing device is configured to provide an interface for generating source code, wherein the source code is compiled into the first code.

What is claimed is:

1. A storage device comprising:
   a first storage medium including volatile memory;
   a second storage medium including persistent memory;
   a processor configured to communicate with the first storage medium; and
   a memory coupled to the processor, the memory storing instructions that, when executed by the processor, cause the processor to:
      receive a first code provided by a computing device based on execution of a first function of a software process, wherein the first code includes instructions that implement a software cache fetching algorithm specified by the computing device;
      execute the first code to implement the software cache fetching algorithm;
      perform a first update of the first storage medium based on the first code, wherein the first update includes fetching first data from the second storage medium to the first storage medium based on the software cache fetching algorithm, wherein the first data is identified by a second function of the software process;
      receive a second code provided by the computing device;
      execute the second code; and
      perform a second update of the first storage medium based on the second code.

2. The storage device of claim 1, wherein the first code is for retrieving first data from the second storage medium and storing the first data into the first storage medium.

3. The storage device of claim 2, wherein the second code is for modifying the first data from the first storage medium.

4. The storage device of claim 2, wherein the second code is for retrieving second data from the second storage medium and storing the second data into the first storage medium.

5. The storage device of claim 2, wherein the first storage medium includes volatile memory, and the second storage medium includes non-volatile memory.

6. The storage device of claim 2, wherein the instructions further cause the processor to:
   receive a first command from the computing device;
   access the first storage medium for the first data based on the first command;
   determine a first status of the first data associated with the first storage medium; and
   retrieve the first data from the first storage medium.

7. The storage device of claim 6, wherein the instructions further cause the processor to:
   receive a second command from the computing device;
   check the first storage medium for the first data based on the second command;
   determine a second status of the first data associated with the first storage medium; and
   retrieve the first data from the second storage medium.

8. The storage device of claim 2, wherein the storage device includes a cache controller for processing movement of data from the second storage medium into the first storage medium.

9. The storage device of claim 1, wherein the first code includes compiled machine-readable code.

10. The storage device of claim 1, wherein the computing device is configured to provide an interface for generating source code, wherein the source code is compiled into the first code.

11. A method comprising:
    receiving, by a storage device, a first code provided by a computing device based on execution of a first function of a software process, wherein the first code includes instructions that implement a software cache fetching algorithm specified by the computing device;
    executing, by the storage device, the first code to implement the software cache fetching algorithm;
    performing, by the storage device, a first update of a first storage medium based on the first code, wherein the first update includes fetching first data from a second storage medium to the first storage medium based on the software cache fetching algorithm, wherein the first data is identified by a second function of the software process;
    receiving, by the storage device, a second code provided by the computing device;
    executing, by the storage device, the second code; and
    performing, by the storage device, a second update of the first storage medium based on the second code.

12. The method of claim 11, wherein the first code is for retrieving first data from the second storage medium and storing the first data into the first storage medium.

13. The method of claim 12, wherein the second code is for modifying the first data from the first storage medium.

14. The method of claim 12, wherein the second code is for retrieving second data from the second storage medium and storing the second data into the first storage medium.

15. The method of claim 12, wherein the first storage medium includes volatile memory, and the second storage medium includes non-volatile memory.

16. The method of claim 12 further comprising:
    receiving a first command from the computing device;
    accessing the first storage medium for the first data based on the first command;
    determining a first status of the first data associated with the first storage medium; and
    retrieving the first data from the first storage medium.

17. The method of claim 16 further comprising:
    receiving a second command from the computing device;
    checking the first storage medium for the first data based on the second command;
    determining a second status of the first data associated with the first storage medium; and
    retrieving the first data from the second storage medium.

18. The method of claim 12, wherein the storage device includes a cache controller for processing movement of data from the second storage medium into the first storage medium.

19. The method of claim 11, wherein the first code includes compiled machine-readable code.

20. The method of claim 11, wherein the computing device is configured to provide an interface for generating source code, wherein the source code is compiled into the first code.

\* \* \* \* \*